United States Patent [19]
Perkins

[11] 3,944,998
[45] Mar. 16, 1976

[54] DISPLAY SYSTEM
[76] Inventor: Robert B. Perkins, 309 Sweet Briar Court, Joppa, Md. 21085
[22] Filed: Nov. 4, 1974
[21] Appl. No.: 520,798

[52] U.S. Cl. ..... 340/324 AD; 178/6.61; 340/27 NA; 343/6 TV; 360/14
[51] Int. Cl.² ............................................. G08B 5/36
[58] Field of Search ............... 340/27 NA, 324 AD; 343/5 EM, 5 LS, 6 TV; 360/14; 358/4; 178/6.61

[56] References Cited
UNITED STATES PATENTS

| | | | |
|---|---|---|---|
| 3,076,120 | 1/1963 | Matthews et al. | 343/5 EM |
| 3,415,946 | 12/1968 | Bedford | 343/6 TV |
| 3,485,946 | 12/1969 | Jackson et al. | 340/324 AD |
| 3,579,234 | 5/1971 | Tsumura et al. | 340/324 AD |
| 3,716,860 | 2/1973 | Bechtel | 343/5 LS |
| 3,821,730 | 6/1974 | Carey et al. | 340/324 AD |
| 3,849,773 | 11/1974 | Katahira et al. | 340/324 AD |

Primary Examiner—David L. Trafton
Attorney, Agent, or Firm—Webster B. Harpman

[57] ABSTRACT

A cathode-ray tube display system such as aircraft radar system in which alternative input information such as aircraft approach charts are suitably stored and may alternatively be displayed on the cathode-ray tube.

5 Claims, 2 Drawing Figures

3,944,998

DISPLAY SYSTEM

BACKGROUND OF THE INVENTION

This invention relates to alternative video type display systems particularly for use in airborne environments, particularly for use in displaying airport approach information.

At the present time, it is believed that there are an excess of 5,000 approach charts for United States airports. These approach charts incorporate a variety of information, including information required for instrument approaches to each airport.

These approach charts are currently printed and distributed at least by the U.S. Government and are updated periodically. Approach charts are bound in looseleaf notebooks which must be retained by the pilots so that they have the necessary charts available for landing at any airport. It is necessary periodically when the revisions to any of the individual charts are received for someone, typically the pilot, to replace the outdated pages with the revised ones.

In use, it is necessary to determine where an appropriate chart is located in the notebooks, and then to open the notebook and have the chart exposed for use by the pilots when making their approach to any particular airport.

It would be advantageous, to incorporate this information in a form which might be more compatible with the equipment in airplane cockpits and more easily and effectively displayed for the use of the pilots.

SUMMARY OF INVENTION

In accordance with the present invention, there is provided an apparatus for displaying airport instrument approach information for use by pilots using types of display equipment existing in aircraft. Typically, many of the more sophisticated aircraft, and in all commercial aircraft, include some type of radar system such as a weather radar which incorporate a CRT display.

The present invention contemplates utilizing existing CRT displays alternatively to display the instrument approach information.

According to the present information, the instrument approach information for each airport would be recorded on a suitable medium such as magnetic tape or magnetic cards in a format compatible with the display system in use. When a pilot would desire to utilize a display of the particular airport instrument approach information, the storage medium would be inserted and connected to the CRT display so the desired information would be displayed for use by the pilot.

In one embodiment of the present invention, this stored video information could be alternatively connected as an input to the video circuits of the display system utilizing all of the display tube control circuits forming a part of the display system. Alternatively, the video storage system could incorporate a scanning circuit for a particular display so that a universal display format for any tube could be employed whereby the scanning configuration of an existing display system could be modified to accommodate the stored approach information.

Numerous other advantages and features of the present invention will become readily apparent from the following detailed description of the invention and of the disclosed embodiments thereof, from the claims and from the accompanying drawing where each and every detail shown is fully and completely disclosed as a part of this specification, and in which like numerals refer to like parts.

DETAILED DESCRIPTION

Figure 1:
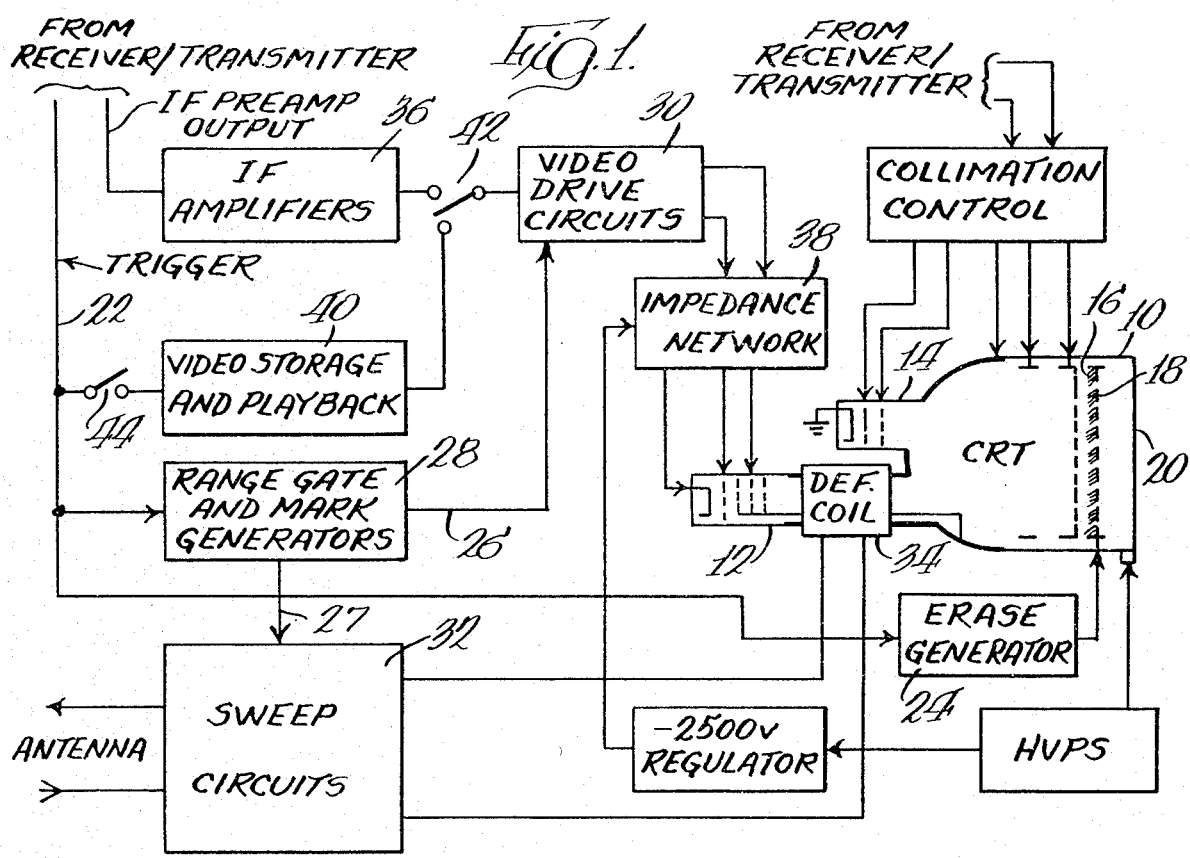
FIG. 1 is a block diagram of a system showing one embodiment of the present invention.

While this invention is susceptible of embodiment in many different forms, there is shown in the drawings and will be herein described in detail an exemplary embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

FIG. 1 shows a block diagram of a video display system that may be used in connection with the present invention. The basic display system disclosed in FIG. 1 is an RCA DST indicator system typically used with an RCA AVQ-55 weather radar system.

This system incorporates a display and storage type cathode-ray tube 10 designed for direct viewing under conditions of high ambient light. The display storage tube 10 utilizes two independent electron gun structures identified for convenience as the write gun 12 and the view gun 14.

The write gun 12 generates a high velocity electronic beam which is and can be intensity-modulated with information and deflected to effect the desired display, normally reflecting parameters such as range and azimuth.

The high velocity write beam is used to energize or "write" on a film of dielectric material, the storage surface 16, which is deposited on a fine mesh screen, the storage mesh 18 which is normally located near the viewing face 20 of the tube 10. In the writing or generating a display, an electrostatic charge proportional to the write beam intensity is stored on the storage surface 16. The view gun 14 thereafter provides a low velocity flooding beam which passes through the charged portion of the storage mesh 16 and excites the phosphors on the viewing face 20.

The receiver/transmitter of the radar system generates a trigger pulse on line 22 which is utilized to sequence in time the entire system. In normal operation, the trigger pulse on line 22 energizes an erase generator 24 to cause application of a positive pulse to the storage mesh 18. As a result, electrons from the view beam are caused to land on the storage surface 16 without secondary emission to charge the storage surface 16 negatively and restore its surface to its original condition of retarding the view beam.

The trigger pulse on line 22 also initiates an output on lines 26 and 27 of the range gate and mark generators 28 which synchronize the operation of the video drive circuits 30 and the sweep circuits 32 so that the intensity modulated writing signal is synchronized with the signals applied by the sweep circuits to the deflection coil 34 to produce an appropriate display.

The video signal is coupled to the video drive circuits 30 through an I-F amplifier circuit 36. The output of the video drive circuits intensity modulates the write gun 12 through an impedance network 38.

The desired approach charts are recorded on suitable magnetic media such as video tape or cards capable of having video information magnetically stored thereon. When a particular display of approach information is desired, the appropriate display is selected. In the case of video magnetic cards, an appropriate card is inserted into the video storage and playback 40 and in the case of video tape, the frame containing the desired information is selected. Techniques for selecting desired frames of magnetic tape and other recording media are disclosed in U.S. Pat. Nos. 3,514,537, 3,564,161, 3,594,729 and 3,647,951.

Once the desired frame has been selected or the discrete medium has been inserted, the system is placed in the recording display mode by operation of the control switches 42, 44. The first control switch 42 disconnects the output of the IF amplifiers from the video drive circuits 30 and connects the output of the video storage and display to the input of video drive circuits 30. The second control switch 44 is closed to connect the trigger pulse on line 22 to the video storage and playback 40 to synchronize its operation with the balance of the system.

In the embodiment of FIG. 1, the video information is recorded on the storage medium in conformity with the display system utilized. The recorded video information is displayed using the existing components of the display system, the range gate and mark generators 28, the video drive circuits 30 and the existing sweep circuits 32 under control of the trigger pulse on line 22.

Figure 2:
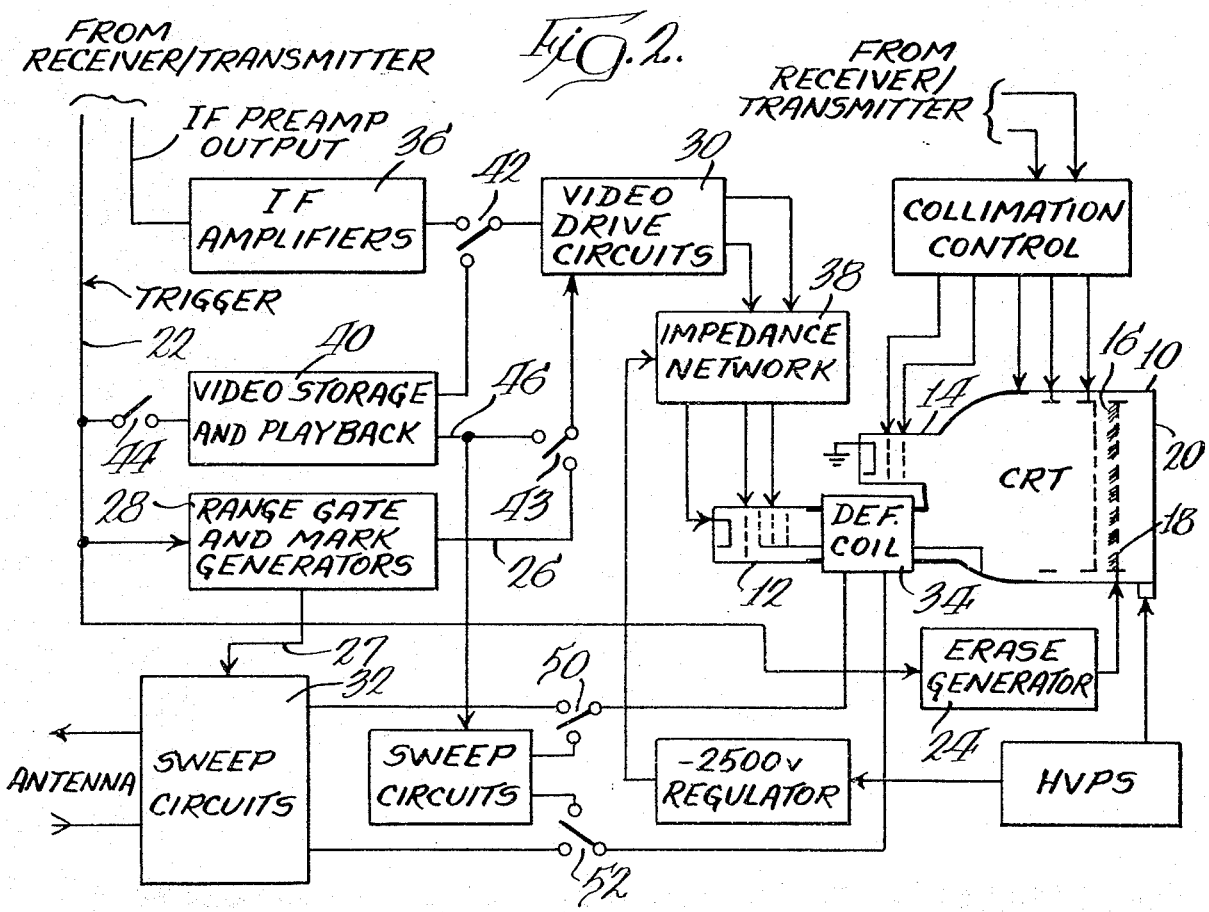
FIG. 2 is an alternative block diagram showing an alternative embodiment of the present invention.

Alternatively, in FIG. 2, the video storage playback 40 may incorporate its own timing and sync circuits. In this embodiment, the output of the IF amplifier 36 and the range gate and mark generator 28 are both disconnected from the video drive circuits 30 when switches 42, and 43 are actuated. In this embodiment, the sync output 46 of video storage and playback 40 is connected to the video drive circuits 30 and to supplemental sweep circuits 48. Sweep circuits 48 generate sweep signals corresponding to the format of the recorded video information, which are connected to coil 34 when switches 50, 52 are actuated to disconnect the output of sweep circuits 32. Thus, in this embodiment, the video information can be recorded in any suitable and desired format compatible with the capabilities of the DST tube 10.

It should be clear while the present invention has been described and shown for use with a specific CRT display system, other display systems and configurations can be utilized. For example, the present invention could be adapted for use in the system disclosed in U.S. Pat. No. 3,605,083 in which the display tube information is presented by use of a spiral raster.

Any type of suitable display system can be utilized since the information to be displayed is static and is to be displayed only in a static condition only so long as the pilot desires. One of the advantages of the present system is that the pilot can conveniently switch back and forth between the primary display such as the radar weather display, or the type of display disclosed in U.S. Pat. No. 3,605,083, and switch to the landing field approach chart for such duration as is convenient.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a radar display system of the type having means for transmitting and receiving radar signals via an antenna:
    cathode-ray tube means responsive to received radar signals for displaying information representative of an input applied thereto;
    means responsive to the received radar signals for applying an input representative thereof to said tube means;
    video storage and playback means for storing recorded video signals to be displayed by said tube means, said recorded video signals representing information different than the information represented by the received radar signals;
    said circuit means being further responsive to said recorded video signals for applying an input representative thereof to said tube means;
    means for selectively and alternatively connecting said received radar signal or said recorded video signal to said circuit means; and
    means connected to the radar antenna and to said tube means for generating raster signals in synchronism with operation of the antenna, to effect display of information represented by said selected input;
    whereby said cathode-ray tube means displays information representative of either said received radar signals or said recorded signals in response to said raster signals and said selected input.

2. In a system as claimed in claim 1,
    means for providing a trigger pulse,
    means responsive to said trigger pulse for applying primary synchronizing signals to said circuit means and to said raster generating means, and
    means for selectively applying said trigger pulse to said video storage and playback means when said alternative information is being displayed.

3. In a system as claimed in claim 2,
    said video storage and playback means providing alternative synchronizing signals, and
    means effectively disabling said primary synchronizing signals and applying said alternative synchronizing signals to at least said circuit means.

4. In a system as claimed in claim 3,
    alternative radar generating means for generating alternative radar signals to accommodate the format of the video signals stored in said video storage and playback means, and
    means for selectively disconnecting said radar generating means from said tube and for connecting said alternative radar generating means to said tube when said video storage and playback means is connected to said circuit means.

5. In a system as claimed in claim 4,
    means for applying said alternative synchronizing signal to said alternative raster generating means.

* * * * *